(No Model.) 4 Sheets—Sheet 1.
D. HAZARD.
SAW SHARPENING MACHINE.
No. 518,187. Patented Apr. 10, 1894.
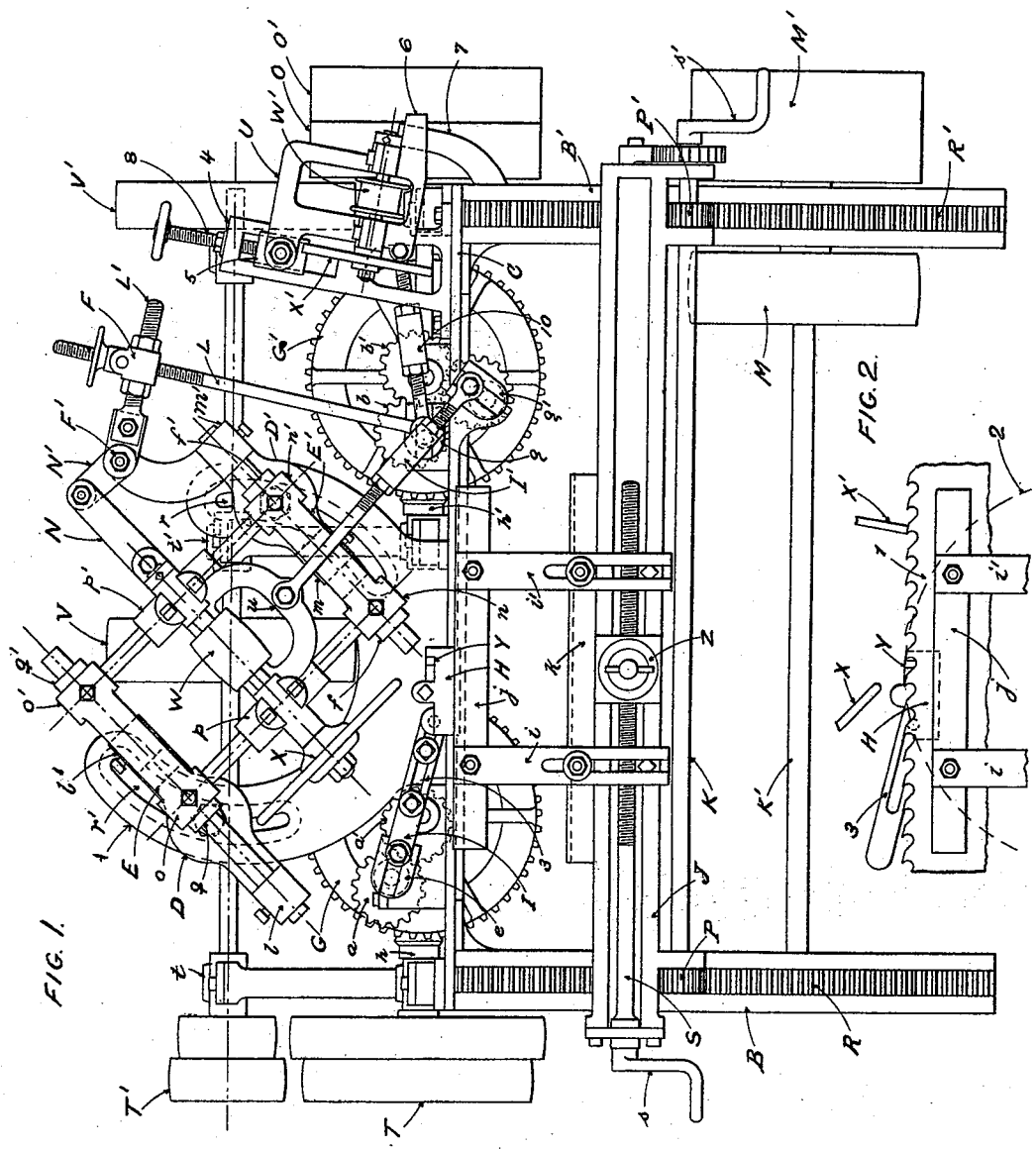
WITNESSES
M. L. Raymond
W. J. O'Meara
Dexter Hazard
INVENTOR
By Clark and Pearl
his ATTORNEYS.

(No Model.) 4 Sheets—Sheet 2.
D. HAZARD.
SAW SHARPENING MACHINE.
No. 518,187. Patented Apr. 10, 1894.
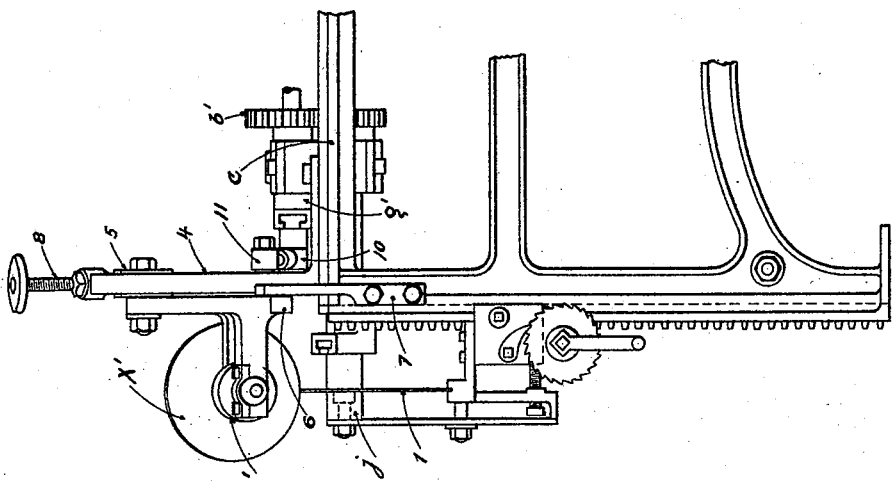
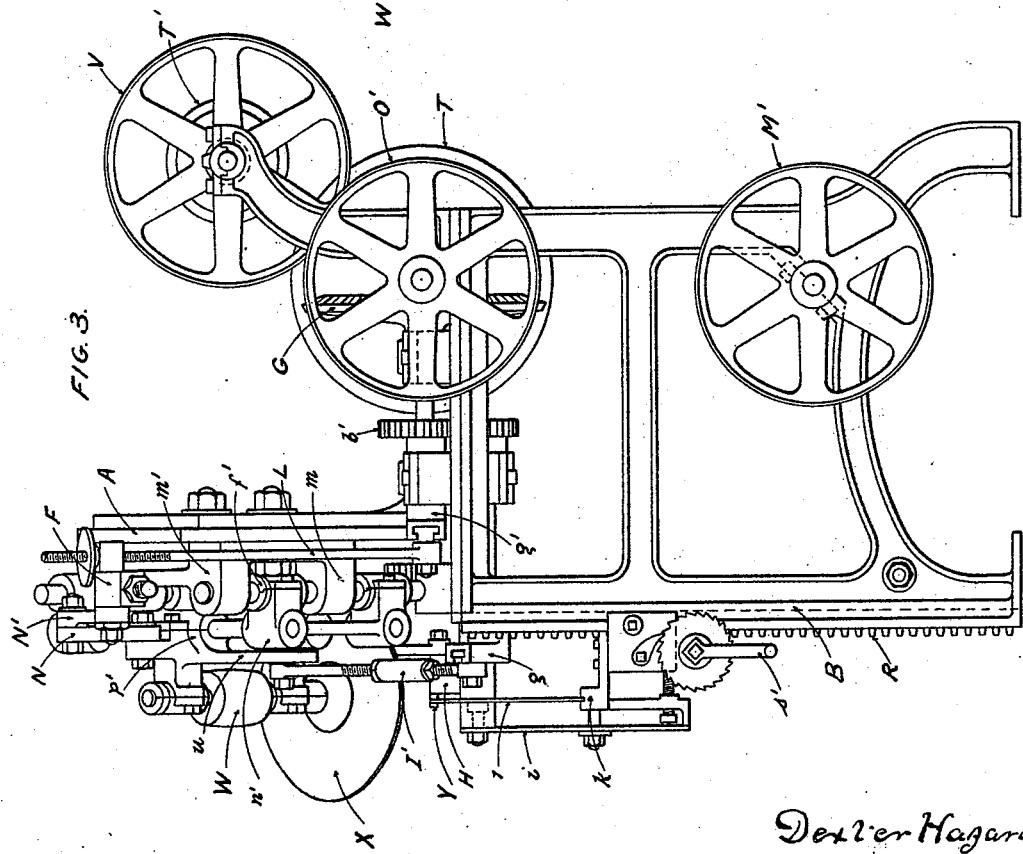
WITNESSES
M. L. Raymond
W. J. O. Mears
Dexter Hazard
INVENTOR
By Clark and Pearl
his ATTORNEYS.

(No Model.) 4 Sheets—Sheet 3.

D. HAZARD.
SAW SHARPENING MACHINE.

No. 518,187. Patented Apr. 10, 1894.

WITNESSES
M. L. Raymond.
W. J. O'Meara

Dexter Hazard
INVENTOR

By Clark and Pearl
his ATTORNEYS.

(No Model.) 4 Sheets—Sheet 4.
D. HAZARD.
SAW SHARPENING MACHINE.

No. 518,187. Patented Apr. 10, 1894.

WITNESSES
M. L. Raymond
W. J. O'Meara

Dexter Hazard
INVENTOR

By Clark and Pearl
his ATTORNEYS.

UNITED STATES PATENT OFFICE.

DEXTER HAZARD, OF MARQUETTE, MICHIGAN, ASSIGNOR OF ONE-HALF TO FREDERICK O. CLARK, OF SAME PLACE.

SAW-SHARPENING MACHINE.

SPECIFICATION forming part of Letters Patent No. 518,187, dated April 10, 1894.

Application filed December 12, 1893. Serial No. 493,492. (No model.)

*To all whom it may concern:*

Be it known that I, DEXTER HAZARD, of Marquette, in the county of Marquette and State of Michigan, have invented a new, novel, and improved device, which will be automatic in its operation, for grinding solid saw-teeth formed on the arcs of circles, of which the following is a specification.

My invention has for its object the production of a mechanism which will be automatic in its operation for sharpening saw teeth formed on the arcs of circles, as stated above. Also teeth, the face of which are formed by the semi-circle of an arc, except the cutting point; and the backs of which are formed upon the tangents of the arc, as above described.

Figure 5:
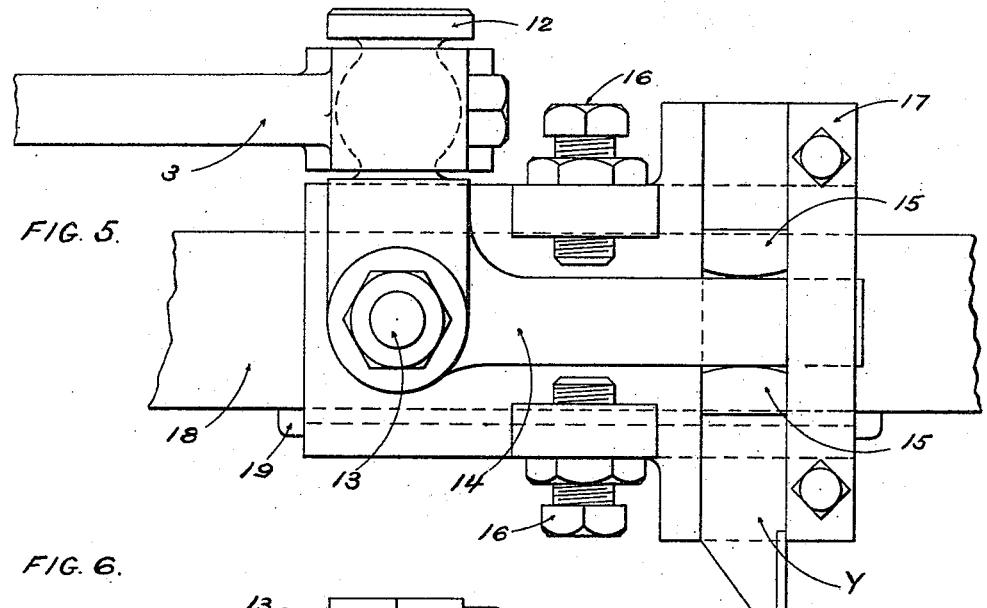
Figure 6:
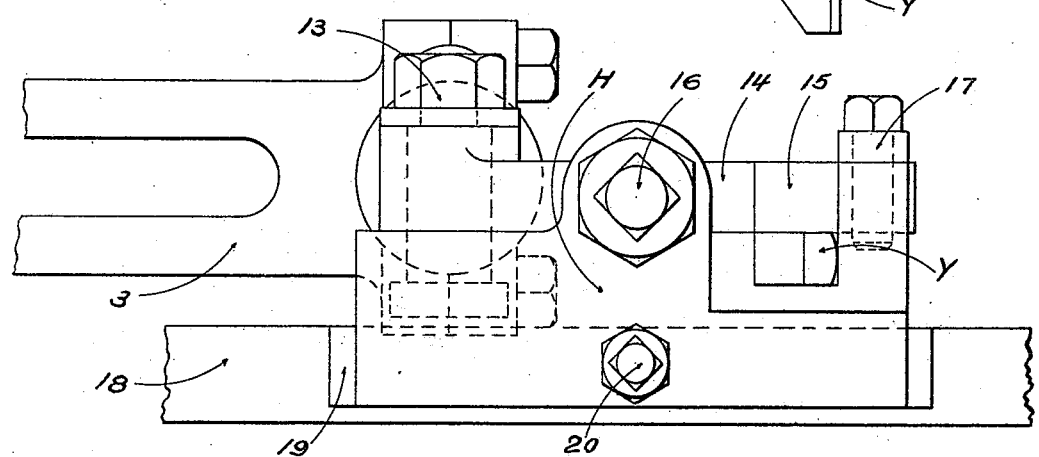
Figure 7:
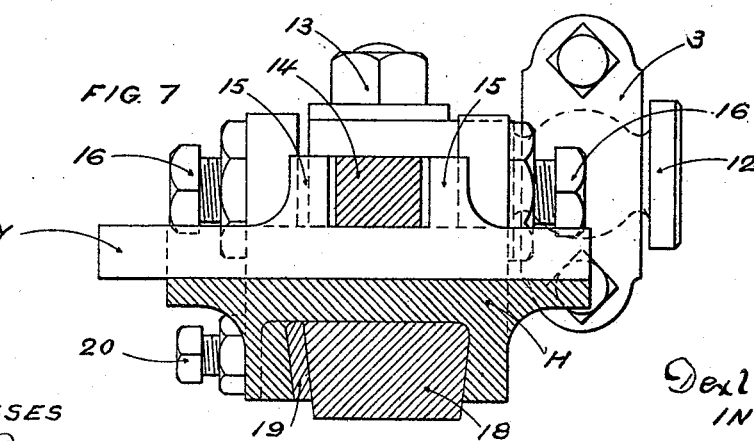
Figure 8:
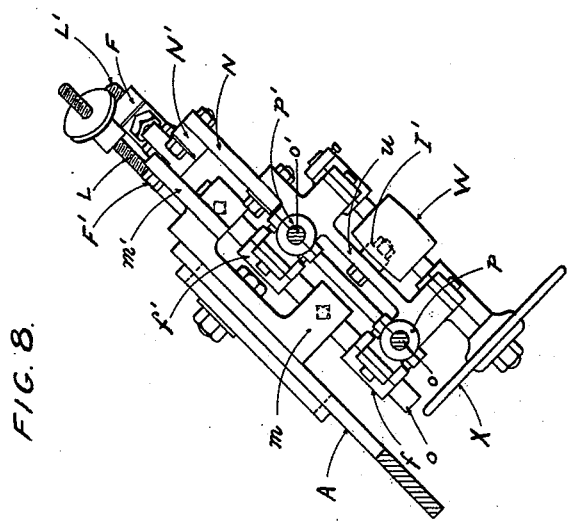

In the drawings, Figure 1 is the face or front view of my invention, in elevation, as it will appear when adjusted, ready for operation, except the saw. Fig. 2 is a section broken off from a band or gang saw, as it will appear when in the machine under both stones. Also showing a broken section of both stones marked X and X'. Also showing a part of the mechanism which moves the saw along under the stones. Fig. 3 is an end view of Fig. 1, in elevation, showing the machine as it will appear with the saw I in position under the first stone. The second stone X' does not appear in this figure but is shown in Fig. 4. Fig. 4 is the same view of the machine as Fig. 3, showing the second stone X' attached and in position, as it will appear when the machine is complete. Fig. 5 is a top and face view of the mechanism, as appears in Fig. 1, marked H. Y., which is for the purpose of moving the saw under the stones X and X'. Fig. 6 is the side view of Fig. 5, showing in broken section the flat side upon which this mechanism moves forward and backward, in its operation. Fig. 7 is the end view of Fig. 6, showing Fig. 6 resting upon the slide 18. Fig. 8 is a section taken through frame $u$, bracket A, and connected parts in Fig. 1, showing the relative arrangement of these parts.

X is an emery wheel which is held in position by the arbor W. This arbor is held in position by an iron frame $u$. This frame is held to the slides by boxes $p$ and $p'$. The small frame $u$ is moved forward and back upon these slides by the rod I', which is connected to a crank $g'$. This crank is driven by a shaft which receives its motion from elliptical gears marked $b'$. The first elliptical gear receives its motion from a shaft which is driven by an ordinary beveled gear marked G'. The first pair of slides to which the frame $u$ is connected is held in position by $n$ and $n'$, which are two pair of boxes cast solid at right angles to each other, and connected by a rib cast to one end of each. These double boxes connect one pair of slides to the other and allow the forward and back motions, and the end or lateral motions to operate at the same time, which will allow the stone to grind any circle that may be desired.

N' is a rocking bar which is attached to the bracket $m'$ by a bolt marked F'.

N connects the rocking bar N' to the frame U, which carries the arbor.

L' is a rod, provided with a thread at one end, and connected to N' at the other.

F is one-half of a double box, which is held in position by L'.

L is a rod which passes through box F behind L' and is provided with a thread and a wheel, which is also provided with a thread to correspond with the thread on L. The opposite end of L is connected to a crank. When this crank is in motion, it will appear how the above mechanism will give to the arbor W the lateral or end motion, as desired.

A is a large bracket provided with two perpendicular arms formed on the arcs of circles.

$r$ and $r'$ are open slots cast in these circular arms.

$l$ and $l'$ are a pair of boxes cast solid to D. D is held to the arms on A by bolts which pass through the open slots in A. With the use of these boxes $l$ and $l'$, the bottom pair of slides are connected to this bracket A and as the double boxes $n$ and $n'$ connect the top and bottom slides, it will appear how this mechanism is held in position, as A is connected to the frame of the machine at the bottom by bolts. With the use of these elliptical gears, a fast and slow motion can be given to the small frame $u$ in either direction, as may be desired, in every revolution which the different cranks make. As the elliptical gear on each crank shaft is driven by the one gear $b'$, both cranks must make the same number of revolutions in any given time. With this mechanism, it will appear how the stone will continue to grind any one shape of teeth that may be desired until the mechanism is adjusted to grind some other form.

H is a small sliding lock, which receives its transverse motion from a slotted rod, marked I, which is driven by a crank $e$. This crank is also driven by elliptical gear $a$, which receives its motion from a shaft driven by an ordinary gear wheel G. This large gear wheel G is a duplicate of G'.

$h$ and $h'$ are pinions driven by one shaft. These small pinions $h$ and $h'$ give the large gear wheels G and G' their motion. It will appear that these pinions $h$ and $h'$ will give the gear wheels G and G' the same continuous motion, because these pinions $h$ and $h'$ are of the same diameter and are driven by the one shaft, which shaft receives its motion from the pulley $o$, which is driven by a belt from the pulley M'. The pulley M' is held in position by a shaft, upon which is placed the pulley M. This pulley M is connected to whatever motive power may be used by a belt. From this belt, which is connected to M, the rest of the mechanism receives its motive power.

T is one pair of cone pulleys, connected to the same shaft which drives the pinions $h$.

T' is a small pair of cone pulleys, which drives the shaft upon which it is placed and receives its motion from a belt, which connects it to T.

V is a pulley which drives the arbor W which gives the stone X its desired motion.

$t$ is a box and standard which holds the top shaft in position, and is connected at the bottom by bolts to the frame of the machine.

X' is the second stone and is held in position by the arbor W'. This arbor is held in position by a swinging frame U, which frame is connected by a bolt to a sliding box marked 5. This box 5 is held in position by a rod marked 8, which is provided with a thread. Said rod 8 is held in position by passing through the top of the frame marked 4. This frame 4 is provided with a slot to correspond with the size of the square box 5. Said frame 4 is connected at the bottom to the frame of the machine by bolts. With the use of this sliding box and this rod 8, which is provided with a thread, the operator can raise or lower the frame U, which will allow the stone to be raised or lowered as may be desired, to remove the amount of steel necessary from the top of the point of the tooth.

The frame U at the bottom is connected by rod 10 to the same crank which drives the rod L. It will appear when this crank is in motion how the rod 10 will give the swinging frame U a forward and back motion, which will cause the stone X' to be moved forward and back over the point of a tooth at the same time the other stone X is grinding the face and circle throat of another tooth.

This machine is built to sharpen from thirty to forty teeth per minute, according to the speed at which the large pulley M' is driven. It will appear as the mechanism is all driven by the one shaft, which drives the small pinions $h$ and $h'$, the fast and slow motion, which the elliptical gearing will produce, in each revolution, by adjusting the crank, any desired circle or proportion of arcs can be obtained, and no one part of the mechanism can get out of time with the other.

$j$ is a piece of wood, and is connected to pieces of flat spring steel marked $i$ and $i'$, which are provided with slots, and are held to $k$ by slots.

$k$ is a rest upon which the back of the saw is placed. The dotted line in $k$ represents a narrow groove in which the back of the saw moves along and holds the back of the saw in position. These steel springs $i$ and $i'$ force the piece of wood $j$ against one side of the saw and hold the saw firm against the rest, which is attached to the frame of the machine, and is for the purpose of holding the saw directly under the center of the stone.

J is a thin flat cast bar which is connected to the legs of the machine B.

P and P' are small gear wheels which are provided with cogs that correspond with the teeth R, which are cast in the leg of the machine. These pinions P and P' are held in position by a shaft upon which is placed a crank marked $s'$. By turning this shaft these pinions will raise or lower the bar J, which will allow the saw to be raised up or down as may be desired, to bring it up to the edge of the stone.

The shaft K which operates the small pinions P and P' is provided with a ratchet-wheel between the end of the frame J, and the crank $s$. Upon the end of the flat bar J directly over the ratchet-wheel is placed a pawl or dog. As this shaft is turned over, the ratchet-wheel moves underneath this dog, which falls into the notches and prevents the shaft from turning backward and holds the bar J up at any point desired.

Arbor W' is driven by a bolt from the pulley V', which is upon the same shaft, driven by T'.

Fig. 18 is a flat slide which holds the lock frame H in position.

Y is a short square bar, which is moved forward and back through the lock frame 14, which is a piece of steel provided with long and short projecting tongues in the shape of an ordinary mechanic's square, and is held in the lock frame H by a bolt marked 13.

12 is a part of 14, and is turned to what is understood to be the shape of a ball-joint.

3 is the arm which connects 12 to the crank $e$.

16 are set-screws, which are held in position by lugs, which are cast to the sides of the lock frame H. Between these set-screws is an open space.

It will appear as the rod 3 moves 12 in either direction, 14 will be moved until it comes against the end of the set-screws 16. This open space between these set-screws, 16, is for the purpose of allowing 14 to give the sliding bolt Y an end motion. When 14 is moved in the direction of the set-screw which is in the same side of the frame as 12 appears, the sliding bolt Y will be drawn back into the lock. This end motion to Y is necessary to prevent it drawing the saw backward as the bolt Y is returning on its backward motion to the proper distance to correspond with the vacant space between the front and back of the next tooth to be sharpened. Then, as the crank reverses, 12 will move in opposite direction and 14 will force the bolt Y forward until it passes through the vacant space between the teeth, and as 14 comes against the set-screw on the opposite side, then the sliding frame will be moved forward. As the bolt Y comes in contact with the tooth, it will move the saw forward to the desired position. Now it will appear with the end motion of Y, this mechanism can move the saw forward, and by Y moving endwise until it is clear of the body of the saw, the sliding frame H can be brought backward until the bolt Y is again opposite the open space between the next two teeth. Then by this outward end motion, Y will be forced through the open space between the teeth, and as 14 comes in contact with the set-screw, the end motion will stop, and the forward motion of 3 will cause the lock frame to move forward. As the slot in the lock frame H corresponds with the size of the sliding bolt Y, any end motion of the frame H will give the bolt Y power to move the saw. The amount of end motion of Y can be controlled as the space between the set-screw 16 is increased or decreased, and the amount of the end motion of the sliding frame H can be controlled by adjusting the bolt in the crank e.

What I claim is—

1. In a saw sharpening machine, the combination with supporting bracket A, rods o and o' mounted thereon, of frame u slidably mounted upon said rods; arbor W journaled in said frame; connecting rod I'; bar N; rocking bar N'; box F; threaded rods L and L'; cranks g and g', and the elliptical gears b and b'; all substantially as shown and described.

2. In a saw sharpening machine, the combination with supporting bracket 4, sliding box 5, and swinging frame U mounted thereon; arbor W' journaled in frame U; connecting rod 10, cranks g, and the elliptical gears b and b'; all substantially as shown and described.

3. In a saw sharpening machine, the combination with stationary slide 18, sliding frame H mounted thereon; set-screw 16; sliding bolt Y; bar 14; ball-joint 12; connecting rod 3; crank e; elliptical gears a and a'; all substantially as shown and described.

4. In a saw sharpening machine, the combination with supporting bracket A, rods o and o' mounted thereon, of frame u slidably mounted upon said rods; arbor W journaled in said frame; connecting rod I'; bar N; rocking bar N'; box F; threaded rods L and L'; and b'. Also stationary slide 18, sliding frame cranks g and g', and the elliptical gears b H mounted thereon; set-screw 16; sliding bolt Y; bar 14; ball-joint 12; connecting rod 3; crank e; elliptical gears a and a'; all substantially as shown and described.

5. In a saw sharpening machine, the combination with supporting bracket A, rods o and o' mounted thereon, of frame u slidably mounted upon said rods; arbor W journaled in said frame; connecting rod I'; bar N; rocking bar N'; box F; threaded rods L and L'; cranks g and g'; supporting bracket 4, sliding box 5 and swinging frame U mounted thereon; arbor W' journaled in said frame U; connecting rod 10; crank g and the elliptical gears b and b'; all substantially as shown and described.

6. In a saw sharpening machine, the combination with supporting bracket A, rods o and o' mounted thereon, of frame u slidably mounted upon said rods; arbor W journaled in said frame; connecting rod I'; bar N; rocking bar N'; box F; threaded rods L and L'; cranks g and g', and the elliptical gears b and b'; supporting bracket 4, sliding box 5 and swinging frame U mounted thereon; arbor W' journaled in frame U; connecting rod 10; crank g, and the said elliptical gears b and b'. Stationary slide 18, sliding frame H mounted thereon; set-screw 16; sliding bolt Y; bar 14; ball-joint 12; connecting rod 3; crank e; elliptical gears a and a'; all substantially as shown and described.

DEXTER HAZARD.

In presence of—
WILLIAM J. O'MEARA,
M. L. RAYMOND.